Nov. 6, 1928.
W. G. G. P. LUMSDEN
1,690,741
SEPARATING LIQUIDS OF DIFFERENT SPECIFIC GRAVITY AND MEANS THEREFOR
Filed March 31, 1926    2 Sheets-Sheet 1
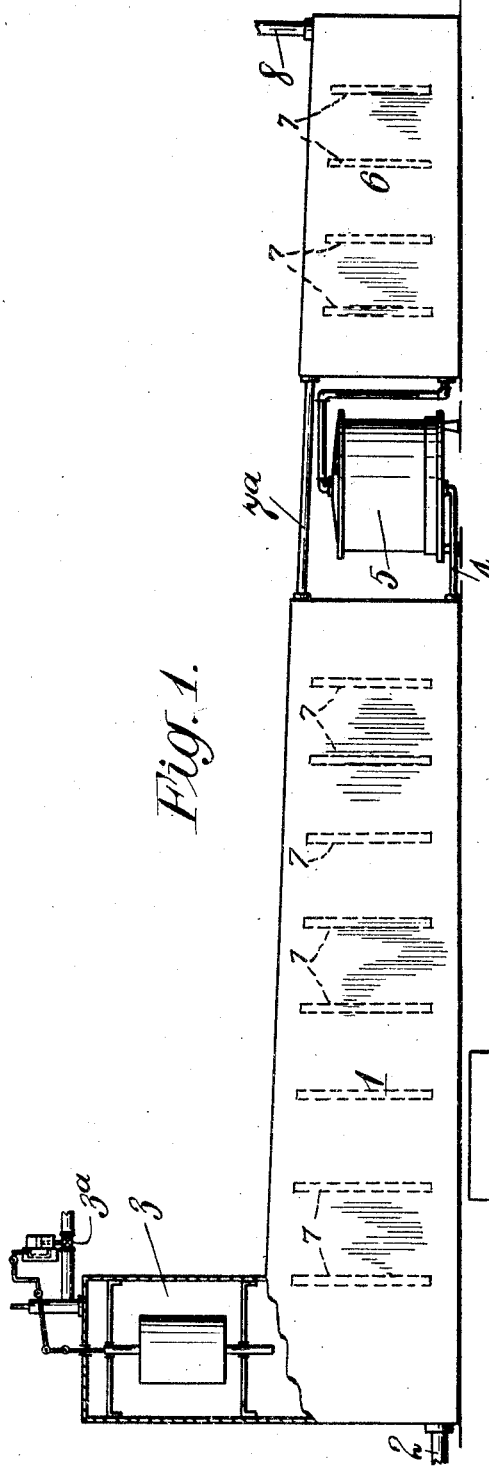
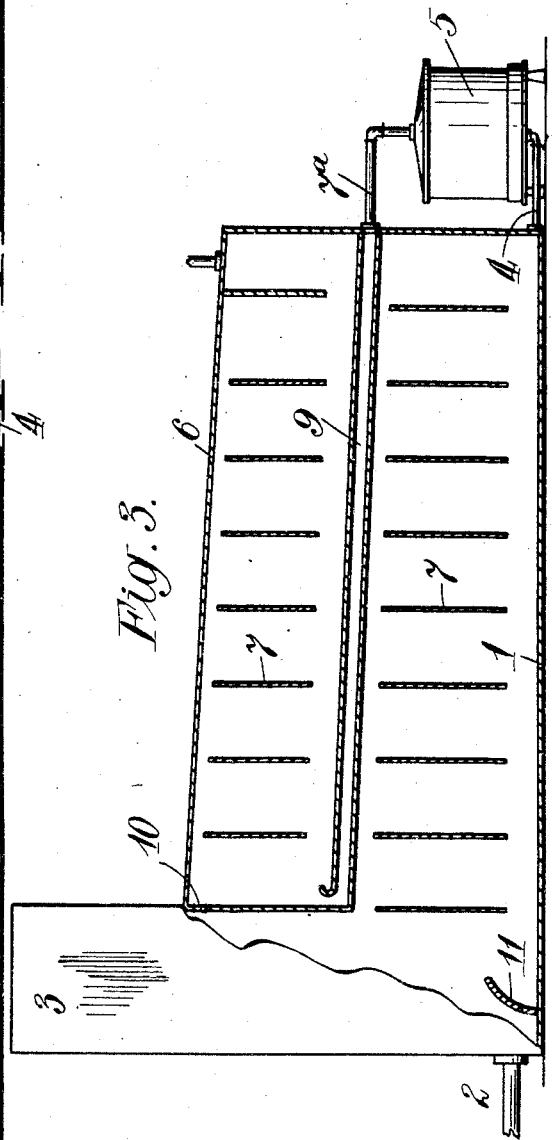
INVENTOR:
William George Gordon Pirie Lumsden.
per
ATTORNEY.

Nov. 6, 1928.  1,690,741
W. G. G. P. LUMSDEN
SEPARATING LIQUIDS OF DIFFERENT SPECIFIC GRAVITY AND MEANS THEREFOR
Filed March 31, 1926   2 Sheets-Sheet 2
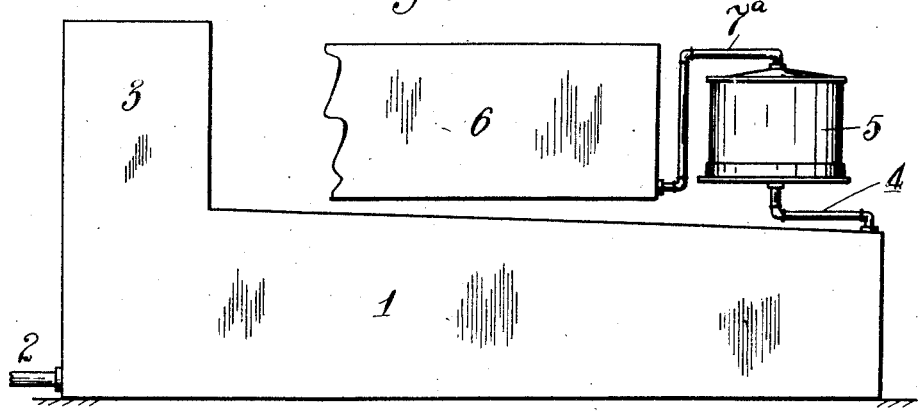
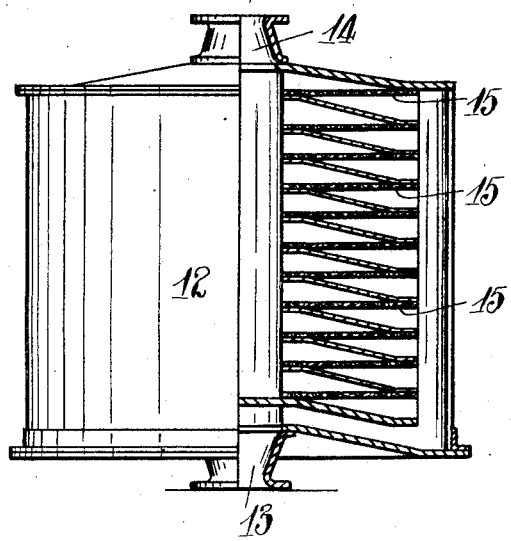
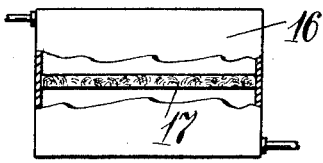
INVENTOR:
William George Gordon Pirie Lumsden
per  H.C.Heide
ATTORNEY.

Patented Nov. 6, 1928.

1,690,741

UNITED STATES PATENT OFFICE.

WILLIAM GEORGE GORDON PIRIE LUMSDEN, OF LONDON, ENGLAND, ASSIGNOR TO RODWAY STEPHENS, LIQUIDATOR OF THE PIEBRIGHT COMPANY LIMITED, (IN LIQUIDATION), OF LONDON, ENGLAND.

SEPARATING LIQUIDS OF DIFFERENT SPECIFIC GRAVITY AND MEANS THEREFOR.

Application filed March 31, 1926, Serial No. 98,840, and in Great Britain April 8, 1925.

The present invention relates to separating liquids of different specific gravity and means therefor.

The present invention being suited for use in separating oil from water such as for example when cleaning out the bilges and tanks of oil burning or oil carrying ships it will be hereinafter described with that application more particularly in view, although it is to be understood to be applicable to any liquids of different specific gravity adapted to be separated thereby and whether used on board ship or any floating support or on land.

The invention is applicable to gravity separators in general, and is suited to apparatus of the kind in which the mixed liquid is caused to flow in a substantially horizontal direction in a vessel of horizontally elongated form for a time sufficient to enable the lighter liquid to rise, and the lighter liquid is collected in the upper portion of the apparatus which is provided with a valve, actuated by the abscence or presence of such lighter liquid, through which such lighter liquid is expelled by reason of the pressure maintained on the mass of liquid.

In general, for ordinary cases, it is found advantageous in such apparatus to employ "baffles" or plates substantially perpendicular to the direction of flow of the liquid, and these plates are usually arranged so that there are only comparatively narrow passages at the top and bottom of the vessel for the flow of the liquids, the general body of the liquid flowing in one direction and the lighter liquid flowing or tending to flow in a contrary direction after rising to the surface. As conducing to such contra-flow the top of the vessel is usually sloped appropriately up or down to the collecting head.

While apparatus of the foregoing kind works well for many separations, it is open to objection in certain cases, for example, when dealing with oil of a mobile nature, the water tending particularly to carry over numerous small particles of oil, sometimes called "oil dust", of negligible flotation power which elude gravity separation.

Now, the object of the present invention is to obviate this disadvantage by causing the small particles to coalesce into drops or blobs of a size well adapted for gravity separation.

According to this invention there is provided a method of separating liquids of different gravity consisting in distributing the mixed liquids over a large wetted surface area so as to cause the particles of oil of negligible flotation power to coalesce for subsequent gravity separation.

By the present invention there is interposed in the flow of the mixed liquid means for causing the particles of negligible flotation power to coalesce for subsequent gravity separation conveniently and advantageously as the flow through the separator is resumed.

As one way of carrying the present invention into practical effect, the mixed liquids are caused to flow amongst animal hairs, or the technical equivalent thereof, as examples of which feathers or clippings of feathers or fine shavings of horn may be mentioned.

The oily matter contained in the water adheres to the hairs until the maximum of service of the material regarded as acting as a filter is reached, whereafter the oil loaded or oil charged material functions as coalescing means causing the small particles of oil, or "oil dust", to coalesce in the form of drops or blobs readily capable of gravity separation.

Cow-hair employed in the form of commercial cow-hair felt is found to serve well for the purposes of the present invention, and in one experimental example the actual form was a coarse textile of jute or like with cow-hair through the meshes and felted on both sides, the total thickness uncompressed being from ⅛" (one-eighth of an inch) to ½" (half an inch) or thereabouts.

Such a mat of commercial cow-hair felt was used on a perforated metal backing presented to the inflow so as to temper any undue forceful impulse.

The mat or felting may be used in various filter-partitioning figurings, as flat, cylindrical, conical, bag, stocking or other forms interposed between the inflow and outflow of the coalescing system.

Any such forms make convenient units for building up coalescing masses or groups, the principle of divided-flow preferably stepping in to associate a relatively large through-put with a distribution of the small particles evenly over a large surface area.

Outflow from the coalescing system should be steadily ordered so as not to tend to again break down or reduce the size of the coalesced particles.

In relation to gravity separation broadly considered, the present invention includes the use of a filter, when spent, as coalescing means.

The accompanying drawings show by way of example the present invention applied to a gravity separator of the kind hereinbefore referred to.

In the drawings, Figs. 1, 2 and 3 are diagrammatic views of forms of apparatus having coalescing means; while Figs. 4 and 5 show two forms of coalescing means suited for carrying out the present invention.

In Fig. 1, a vessel 1 of horizontally elongated form is the primary separator. The mixed liquid enters this vessel 1 at 2. Baffles may be provided in the vessel 1. As the mixture flows therethrough the bulk of the lighter liquid rises and flows backward along the top to a collecting compartment 3. This collecting compartment 3 has a discharge valve 3ª which valve may be an automatically operated valve comprising a valve proper, a float, and a lever connection between the valve and the float.

The heavier liquid with any "oil dust" is discharged from the vessel 1 at 4 into a coalescing apparatus 5.

From this coalescing apparatus 5 the final flow is through the secondary vessel or separator 6, which may have baffles 7. During this final flow the coalesced drops or blobs readily rise and pass to the collecting compartment 3 through a connecting pipe or the equivalent 7ª. The heavier liquid discharge is at 8.

Fig. 2 is similar to Fig. 1, but with the secondary vessel or separator on top of the primary vessel or separator.

The secondary vessel 6 may have its own lighter liquid collecting chamber.

Fig. 3 shows an arrangement with the secondary vessel 6 on top of the main vessel 1, the flow from the coalescing apparatus 5 being by way of a trunk or the equivalent 9. The lighter liquid from this vessel 6 passes to the collecting compartment 3, by way of an opening 10. 11 indicates a guiding baffle adjacent the inlet 2.

Fig. 4 shows by way of example, one form of coalescing apparatus 12, having a divided flow, the inlet being at 13 and the outlet at 14, the flow being divided up between various filtering components. Each component 15 may comprise a filter pad of cow-hair on a fenestrated or reticulated support or backing. The type of apparatus shown by Fig. 4 is for a large through-put.

Fig. 5 shows a coalescing apparatus 16 for a smaller through-put. The component 17 may be of the same form as that in Fig. 4.

To put the components 15 or 17 into service the operation is as follows:—

Thoroughly soak the cow-hair medium in water so as to expel all air and fill the interstices. Then on pumping through, for example, an oil and water mixture, the oil is absorbed or trapped by the hair and the water is discharged free from oil. When the medium has absorbed its maximum of oil, the oil dust is then forced through the medium with the water and emerges from the medium, not as oil dust, but as drops or blobs of oil of appreciable dimensions and having considerable flotation, so that the separation of this oil from the water becomes a simple one of gravity separation.

The example of apparatus described and shewn is a closed system from inlet to outlet, that is to say, the coalescing action takes place unexposed to air and the flow of the mixed liquid through the coalescor is a pressure flow.

Further in the example described and illustrated the oil and water mixture has only a short traverse through a pad, and this arrangement avoids creating an excessive back pressure and prevents any of the accumulated oil from being again emulsified by the searching water flow of the high through-put.

With apparatus according to the present invention the overall dimensions are considerably reduced, for example, the total length of a form of apparatus according to Fig. 1 is 23 ft. 9 inches, this being made up as follows, primary separating chamber 14 ft., space between primary and secondary separating chamber 3 ft. 9 inches and secondary separating chamber 6 ft. The dimensions of a separator of design as shown in Fig. 1 but without the coalescor would be 40 ft. in length and in addition a filter would be required to ensure a discharge of the heavier liquid free from oil. This saving in space is of extreme value especially on board ship.

The present invention is suited to gravity separators of any type, and particularly separators for oil and water. The means at present adopted to minimize the discharge of elusive "oil dust" or "niggers" comprise in some cases excessive dimensions of the separator; complicated baffles, and chamber arrangements, and in all cases the provision of a filter. By means of the coalescor the dimensions of a separator are reduced, complications are removed and no filter is necessary.

What I claim is:—

1. A system for separating liquids of different gravity, comprising a horizontally elongated separating chamber in which as the mixture flows therethrough the greater part of the lighter liquid rises, a collecting-compartment for said lighter liquid, a discharge valve in said collecting-compartment, a coalescor into which the contaminated heavier liquid enters when discharged from said separating chamber, and in which the very small particles of the lighter liquid coalesce to form drops, a second separating chamber receiving the flow from said coalescor, and means between the first and second separating chambers to allow the lighter liquid from said second chamber to pass to the collecting compartment in said first chamber.

2. A system for separating liquids of different gravity comprising two separating chambers in a single unitary tank, a common lighter liquid collecting chamber, and a coalescor interposed between said separating chambers.

In testimony whereof, I affix my signature.

WILLIAM GEORGE GORDON PIRIE LUMSDEN.